US010954881B2

(12) United States Patent
Panini et al.

(10) Patent No.: US 10,954,881 B2
(45) Date of Patent: Mar. 23, 2021

(54) METHOD OF CONTROLLING AN INJECTION APPARATUS OF AN INTERNAL COMBUSTION ENGINE

(71) Applicant: Lombardini S.R.L., Reggio Emilia (IT)

(72) Inventors: Fabio Panini, Modena (IT); Felice Di Iorio, Modena (IT); Mario de Monte, Cavriago (IT)

(73) Assignee: Kohler Co., Kohler, WI (US)

( * ) Notice: Subject to any disclaimer, the term of this patent is extended or adjusted under 35 U.S.C. 154(b) by 135 days.

(21) Appl. No.: 16/274,834

(22) Filed: Feb. 13, 2019

(65) Prior Publication Data

US 2019/0285022 A1   Sep. 19, 2019

(30) Foreign Application Priority Data

Mar. 16, 2018  (IT) ..................... IT102018000003689

(51) Int. Cl.
   *F02D 41/40*   (2006.01)
   *F02D 41/30*   (2006.01)
   *F02D 41/02*   (2006.01)

(52) U.S. Cl.
   CPC .......... *F02D 41/405* (2013.01); *F02D 41/027* (2013.01); *F02D 41/30* (2013.01); *F02D 41/402* (2013.01); *F02D 2200/06* (2013.01); *F02D 2200/0802* (2013.01)

(58) Field of Classification Search
   CPC ...... F02D 41/30; F02D 41/402; F02D 41/405; F02D 41/0235–029; F02D 41/1445–1446; F02D 2200/0802; F02M 63/0225; F02B 1/12; F02B 17/005; F02B 2275/14

USPC .................... 701/103, 104; 123/299
See application file for complete search history.

(56) References Cited

U.S. PATENT DOCUMENTS

| | | | |
|---|---|---|---|
| 2005/0217256 A1* | 10/2005 | Okugawa | F01N 9/002 60/295 |
| 2010/0100304 A1* | 4/2010 | Yasui | F02D 41/405 701/104 |
| 2015/0144107 A1 | 5/2015 | Smith | |

FOREIGN PATENT DOCUMENTS

| | | |
|---|---|---|
| DE | 102016214286 A1 | 6/2017 |
| FR | 2974856 A3 | 11/2012 |
| JP | 10288067 A * | 10/1998 |
| JP | 2006097577 A | 4/2006 |

OTHER PUBLICATIONS

Italian Search Report for Italian Patent Application No. 102018000003689 dated Nov. 13, 2018.
(Continued)

*Primary Examiner* — Carl C Staubach
*Assistant Examiner* — Robert A Werner
(74) *Attorney, Agent, or Firm* — Lempia Summerfield Katz LLC

(57) ABSTRACT

It is hereby disclosed a method of controlling an injection apparatus of an internal combustion engine including setting a minimum value (QMIN) of a fuel quantity that can be injected into the internal combustion engine by the injection apparatus with one injection; preventing the injection apparatus from performing post-injections of fuel quantities having a smaller value than the minimum value (QMIN).

15 Claims, 4 Drawing Sheets

(56) References Cited

OTHER PUBLICATIONS

India Examination Report for India Patent Application No. 201924009423 dated Jul. 31, 2020.
European Office Action for European Patent Application No. 19 159 062.9-1007 dated Oct. 7, 2020.

* cited by examiner

| Calibration Vector | | | | | | | | |
|---|---|---|---|---|---|---|---|---|
| QREQ | 1.000 | 2.000 | 3.000 | 4.000 | 5.000 | 6.000 | 7.000 | 8.000 |
| N | 5 | 3 | 2 | 2 | 1 | 1 | 1 | 1 |

METHOD OF CONTROLLING AN INJECTION APPARATUS OF AN INTERNAL COMBUSTION ENGINE

CROSS REFERENCE TO RELATED APPLICATION

This application claims the benefit of Italian Patent Application No. 102018000003689, filed Mar. 16, 2018, which is hereby incorporated by reference in its entirety.

TECHNICAL FIELD

The present disclosure relates to a method of controlling an injection apparatus of an internal combustion engine. In particular, the method is used for controlling the injection apparatus while performing post-injections, for example during a regeneration of an engine aftertreatment system.

BACKGROUND

An internal combustion engine, such as a diesel engine, may be equipped with an injection apparatus designed for injecting metered quantities of fuel inside the engine cylinders.

The injection apparatus may comprise one or more fuel injectors, each of which may be associated with a corresponding cylinder and may be controlled by an engine control unit (ECU).

Diesel engines may include various after-treatment devices (e.g. diesel particulate filters "DPF") designed to trap or eliminate part of the pollutants contained in the exhaust gas from the engine. These after-treatment devices may become progressively clogged by such pollutants, and may need to be periodically regenerated in order to restore their original efficiency.

The regeneration can be accomplished in various ways, including by heating the after-treatment device to very high temperatures, thereby effectively burning away the pollutants (e.g. the particulate matter) that have been accumulated within.

There are many considerations and challenges with performing this regeneration. To reach the high temperatures needed for regeneration, additional fuel is needed, which can be costly. Additionally, depending on the type of fuel delivery system and specifications of injectors, the amount of additional fuel needed for regeneration may small or difficult to accurately meter or deliver to the cylinder. This could lead to either under-delivery of fuel, whereby the after-treatment device may not appropriately regenerate, or over-delivery of fuel, whereby the after-treatment device may become overheated. A system which can resolve some of these considerations and challenges is desired.

SUMMARY

An object of the present disclosure is solving, or at least positively reducing, the above-mentioned drawbacks. Another object is reaching this goal with a simple, rational and rather inexpensive solution.

This and other objects are achieved by the embodiments of the disclosure having the features reported in the independent claims. The dependent claims delineate additional aspects of the embodiments.

In some systems, an ECU may control one or more fuel injectors in order to perform several fuel injections per engine cycle according to a multi-injection pattern.

An example multi-injection pattern may include one or more main injections, which provide the majority of the fuel that is burnt inside the cylinder. An example multi-injection pattern may further include one or more pilot injections, which may be performed before the main injection(s), one or more post-injections, which may be performed after the main injection(s), or both pilot injection(s) and post-injection(s).

Post-injections may be performed during the exhaust stroke, for example immediately before, or during, (or in some cases, both before and during) the opening of the exhaust valve. One purpose of the post-injections may be for increasing the temperature of the exhaust gasses, for example in order to facilitate regenerating the after-treatment devices (e. g. DPFs) that are coupled to the exhaust system of the internal combustion engine to trap and thus reduce polluting emissions.

In particular, post-injections can be used for raising the temperature of the after-treatment devices. Fuel injected via post-injections may enter the cylinder after the burn of the fuel injected via the main injection, and may exit unburnt from the cylinders via the open exhaust valve into the exhaust system and toward the after-treatment devices. The fuel injected via the post-injections may then be ignited directly within the exhaust system, thereby raising the temperature of the exhaust gasses. These high-temperature exhaust gasses flow through the after-treatment devices, thereby raising their temperature up to values (e.g. higher than 500° C.) that allow the regeneration to take place. The ignition within the exhaust system may be caused, in some instances, due to catalytic reactions (such as ignition within a diesel oxidation catalyst "DOC" located upstream of the after-treatment devices), or in other ways. In still other systems, the fuel may be ignited within the exhaust system in proximity of the after-treatment device.

This process may be difficult in some systems, based on physical limitations of the fuel injectors. For example, in some instances, fuel injectors may be rated or approved for injecting at least a minimum amount of fuel every time they are commanded to perform one fuel injection.

In other words, a fuel injector may be generally unable to inject less than the minimum amount of fuel every single fuel injection.

On the other hand, the quantity of fuel that is requested from a single post-injection may be smaller (and sometimes considerably smaller) than this minimum amount. In these systems, the control scheme may cause the fuel injector to either inject the minimum amount every time it receives a signal that is smaller than the minimum amount, with the result that the real amount of fuel injected by the post-injection may be larger than expected, thereby increasing the fuel consumption and the risk of overheating the after-treatment device.

An embodiment of the disclosure provides a method of controlling an injection apparatus of an internal combustion engine, comprising the steps of:

setting (or identifying) a minimum value of a fuel quantity that can be injected into the internal combustion engine (such as a cylinder of the internal combustion engine) by the injection apparatus with one injection, preventing the injection apparatus from performing post-injections of fuel quantities having a smaller value than the minimum value.

In this way, the injection apparatus is only commanded to perform post-injections of fuel quantities corresponding to a value that is at least equal to (or larger than) the minimum value, thereby ensuring that the real post-injected fuel quantity equals, or closely approximates, a minimum required amount necessary for regeneration, thus advantageously reducing fuel consumption and the risk of overheating the aftertreatment devices.

According to an embodiment of the disclosure, the injection apparatus may be prevented from performing post-injections of fuel quantities having a smaller value than the minimum value by repeating a control cycle including the steps of:
- determining a requested value of a fuel quantity to be injected into the internal combustion engine by means of one post-injection,
- adding the requested value to an aggregate fuel quantity value obtained in a latest preceding execution of the control cycle,
- preventing the injection apparatus from performing post-injections, if the aggregate fuel quantity value is smaller than the minimum value,
- commanding the injection apparatus to perform one post-injection of a fuel quantity having a value equal to the aggregate fuel quantity value when the aggregate fuel quantity value is equal to or larger than the minimum value,
- resetting the aggregate fuel quantity value to zero when the one post-injection is performed.

The aggregation and control of the fuel injection may be carried out by software or hardware associated with the ECU.

Thanks to this solution, while preventing the actuation of too small post-injections, an effective amount of post-injected fuel may nevertheless be introduced into the internal combustion engine, efficiently increasing the temperature of the aftertreatment devices without wasting fuel or overheating the after-treatment devices.

According to another embodiment of the disclosure, the injection apparatus may be prevented from performing post-injections of fuel quantities having a smaller value than the minimum value by the steps of:
- determining a requested value of a fuel quantity to be injected into the internal combustion engine by means of one post-injection,
- determining or calculating a number of power strokes on the basis of the requested value of the fuel quantity,
- preventing the injection apparatus from performing post-injections until that number of power strokes have been done, and then
- commanding the injection apparatus to perform a post-injection of a fuel quantity having a value which is equal to or greater than the minimum value.

Also this aspect has the effect of preventing the actuation of too small post-injections, while guaranteeing that enough post-injected fuel is introduced into the engine to efficiently increase the temperature of the aftertreatment devices.

According to some embodiments, the number of power strokes may be determined as output of a calibration vector receiving the requested value of the fuel quantity as input.

Thanks to this solution the determination of the number of power strokes may be very quick and require very low computational effort (and thus smaller electronic components).

As an alternative, the number of power strokes may be determined as a function of both the requested value of the fuel quantity and the minimum value thereof. In this way the determination of the number of power strokes may be more reliable and effective.

For example, the number of power strokes may be determined with the following equation:

$$\mathrm{Floor}\left(\frac{QMIN}{QREQ} + K\right) = N$$

wherein N is the number of power strokes, QMIN is the minimum value of the fuel quantity, QREQ is the requested value of the fuel quantity and K is a constant which may be comprised between 0 and 1, for example equal to 0.5.

This solution has the effect of providing a number of power strokes which achieves a positive trade-off between fuel consumption and efficiency of the heating process of the aftertreatment devices.

Some of the embodiments described above may include a closed-loop feedback system, but this may not be required. In embodiments with a closed-loop feedback system, the requested value of the fuel quantity may be determined through the steps of measuring a temperature of an engine aftertreatment system, calculating a difference between the measured temperature and a target value thereof, and calculating the requested value of the fuel quantity as a function of the difference.

In other words, the requested value of the fuel quantity may be determined through a feedforward control logic using the temperature of the aftertreatment device as controlling variable and the requested value of the fuel quantity as controlled variable.

In this way, the requested value of the fuel quantity may be progressively and effectively adjusted in order to cause the temperature of the aftertreatment device converging to the target value thereof.

In some embodiments described above, the minimum value of the fuel quantity may be a calibration parameter determined by means of an experimental activity. In this way the minimum value of the fuel quantity can be selected case-by-case on the basis of the performances of the injection apparatus. In other embodiments, the minimum value of the fuel quantity may be a value set according to fuel injector specifications or based on manufacturer recommendations. In still other embodiments, the minimum value of the fuel quantity may be modified or "tuned" by the user of the engine. Other variations are possible.

These embodiments may be incorporated in engines having various numbers of cylinders. In some systems, the injection apparatus may be embodied as one single fuel injector, so that the systems and methods described above may be used individually for each fuel injector of the internal combustion engine individually. As an example, in the embodiment above where the fuel requests are aggregated, it is possible to aggregate the fuel requests on a cylinder-by-cylinder basis. Alternatively, the fuel injectors may be embodied as a group of fuel injectors belonging to the same internal combustion engine, so that the systems and methods described above may be applied to said group of fuel injectors as a whole. As an example, in the embodiment above where the fuel requests are aggregated, it is possible to aggregate the fuel requests for all cylinders together, and when the aggregated total exceeds the minimum total, the cylinder that received the latest fuel request may perform the post-injection.

Another embodiment of the disclosure provides an internal combustion engine comprising an injection apparatus and an electronic control unit configured to:
- set a minimum value of a fuel quantity that can be injected into the internal combustion engine by the injection apparatus in one injection, prevent the injection apparatus from performing post-injections of fuel quantities having a smaller value than the minimum value.

This embodiment of the invention may achieve similar effects of the other systems and methods described above, in particular the effect of reducing fuel consumption and the risk of overheating the aftertreatment devices.

The electronic control unit may be further configured to implement any one of the additional aspects of the method described above, in order to achieve the same relevant effects.

The method can be also carried out with the help of a computer program comprising a program-code for carrying out all the steps of the method described above, and in the form of a computer program product comprising the computer program. The method can be also embodied as an electromagnetic signal, said signal being modulated to carry a sequence of data bits which represent a computer program to carry out all steps of the method.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
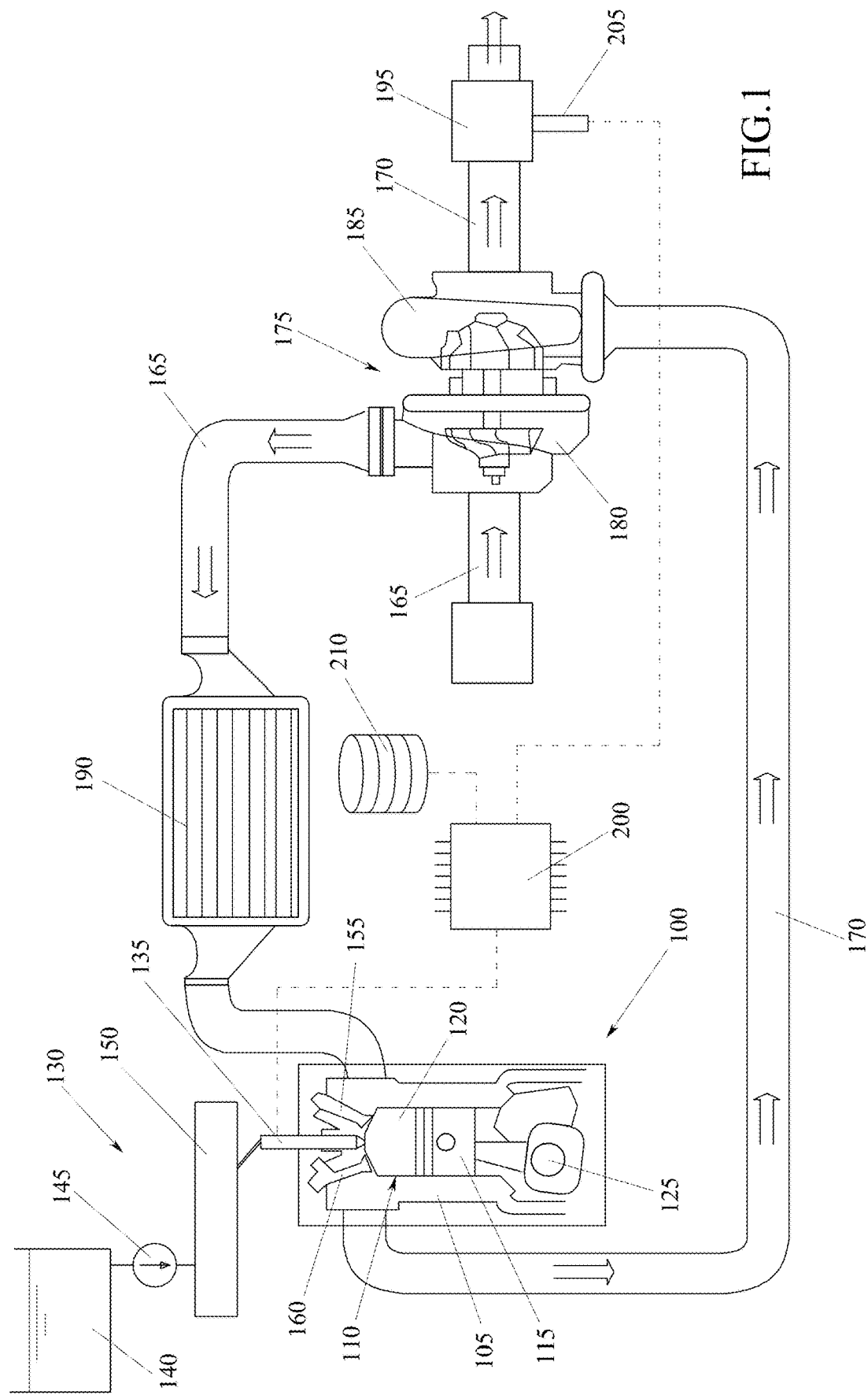
FIG. 1 is a schematic view an embodiment of an internal combustion engine which incorporates the features of the disclosure.

FIG. 1 shows an example embodiment that includes an internal combustion engine (ICE) 100. The internal combustion engine 100 may be, for example, a compression-ignited engine, such as a diesel engine, or another type of engine. The engine 100 may be used in a motor vehicle (not shown), such as a passenger car, a truck or an agricultural off-road vehicle. In other embodiments, the engine 100 may be used in power generators or power equipment. The engine 100 may be used in various other applications.

The internal combustion engine 100 may include an engine block 105 defining at least one cylinder 110. Each cylinder 110 may accommodate a reciprocating piston 115. Each piston 115 may cooperate with the cylinder 110 to define a combustion chamber 120 designed for receiving a fuel and air mixture. The fuel and air mixture may be ignited (typically via compression, but in some systems may be due to a heater or spark). The ignition of the fuel and air mixture may generate hot expanding exhaust gasses that cause the movement of the piston 115. On the opposite side of the combustion chamber 120, the piston 115 may be connected to a crankshaft 125 in such a way that the reciprocating movements of the piston 115 are transformed in a rotational movement of the crankshaft 125.

Fuel may be supplied into the combustion chamber 120 by an injection apparatus 130 having at least one fuel injector 135. The fuel injector 135 may be coupled to the cylinder 110 or otherwise in fluid communication with the combustion chamber in order to inject fuel directly inside the combustion chamber 120. The injection apparatus 130 may be connected with a fuel source 140 (e.g. a tank), and in some cases additionally a pump 145, that draws the fuel from the fuel source 140 and delivers it to a fuel rail 150 in fluid communication with the fuel injector 135. Other variations of fuel delivery systems are possible.

The internal combustion engine 100 may comprise one cylinder 110. In other systems, the internal combustion engine 100 may comprise a plurality of cylinders 110 (e.g. 2, 3, 4, 6, or 8 cylinders), each of which may accommodate a corresponding piston 115 to define a corresponding combustion chamber 120. In multiple-cylinder engines, the injection apparatus 130 may comprise a plurality of fuel injectors 135, each which is coupled to a corresponding cylinder 110. All the pistons 115 may be coupled to the same crankshaft 125. Some or all of the fuel injectors 135 may be in fluid communication with the same fuel rail 150.

Each cylinder 110 may have at least two valves, including an intake valve 155 that allows air into the combustion chamber 120 and at least one exhaust valve 160 that allows exhaust gasses to exit from the combustion chamber 120. The valves 155 and 160 may be actuated by a camshaft which may rotate in time with the crankshaft 125, wherein a cam phaser may be provided for selectively varying the timing between the camshaft and the crankshaft 125.

Intake air may be conveyed to the intake valve 155 by means of an air intake duct 165 that provides air from the ambient environment to the combustion chamber 120 defined by the cylinder 110. The intake air may be passed through an air filter prior to introduction into the combustion chamber 120. If the internal combustion engine 100 comprises a plurality of cylinders 110, an intake manifold (not shown) may be provided for receiving the air from the intake duct 165 and distributing it into all the cylinders 110 via the corresponding intake valves 155.

The exhaust gasses (resulting from the ignition of the fuel and air mixture in the combustion chamber 120) may exit the engine cylinder 110 through the one or more exhaust valves 160, and may be directed into an exhaust duct 170. The exhaust duct 170 may convey the exhaust gasses towards the after-treatment devices prior to expulsion into the ambient environment, or toward an exhaust gas recirculation system for reintroduction into the engine cylinder. In some embodiments where the internal combustion engine 100 comprises a plurality of cylinders 110, all the corresponding exhaust valves 160 may be in fluid communication with an exhaust manifold, which may collect the exhaust gasses and directs them into the exhaust duct 170.

During the operation of the internal combustion engine 100, each piston 115 may move cyclically within the corresponding cylinder 110 between a top dead center (TDC) position, where the volume of the combustion chamber 120 is at a minimum, and a bottom dead center (BDC) position, where the volume of the combustion chamber 120 is at a maximum. Any movement of the piston from the TDC position to the BDC position or vice versa is usually referred to as "stroke".

In a four-stroke internal combustion engine 100, each piston 115 completes one engine cycle every two complete rotations of the crankshaft 125 and four consecutive strokes, including an intake stroke, a compression stroke, a power stroke and an exhaust stroke. During the intake stroke, the piston 115 moves from the TDC position to the BDC position while the intake valve 155 is open to allow fresh air inside the combustion chamber 120. During the following compression stroke, the piston 115 moves from the BDC position to the TDC position, while both the intake valve 155 and the exhaust valve 160 are closed, thus compressing the air within the combustion chamber 120. When the piston 115 is in proximity of the TDC position, the fuel injector 135 starts to supply fuel inside the combustion chamber 120. The fuel is thus mixed with the air and ignited. In spark-ignition engines, for example gasoline engine, the ignition of the fuel is caused by a spark generated by a spark plug. In compression-ignition engines, for example a diesel engine, the fuel is ignited by the elevated temperature of the air in the cylinder due to mechanical compression. In any case, the ignition of the fuel generates the hot expanding exhaust gasses that push the piston towards the BDC position, thus performing the power stroke while the intake valve 155 and the exhaust valve 160 are still closed. During the following exhaust stroke, the piston 115 moves from the BDC position to the TDC position while the exhaust valve 160 is open to allow the exhaust gasses out of the combustion chamber 120.

In systems where the internal combustion engine 100 has multiple cylinders 110, the engine cycles performed by the corresponding pistons 115 may be angularly staggered to one another (with respect to the angular position of the crankshaft 125), so that each piston 115 executes its power stroke at different times. For example, a four-piston internal combustion engine may be configured and operated so that four power strokes are performed every two complete rotations of the crankshaft 125, wherein each one of these four power strokes is performed by a different piston 115 and is separated from the preceding one by 180° of rotation of the crankshaft 125.

In some embodiments, the internal combustion engine 100 may comprise a forced air system such, as a turbocharger 175. The turbocharger 175 may comprise a compressor 180 located in the intake duct 165 and a turbine 185 located in the exhaust duct 170 and rotationally coupled to the compressor 180. The turbine 185 rotates by receiving exhaust gasses from the exhaust duct 170 that directs the exhaust gasses through a series of vanes prior to expansion through the turbine 185. The rotation of the turbine 185 causes the rotation of the compressor 180, whose effect is that of increasing the pressure and the temperature of the air in the intake duct 165. An intercooler 190 may be disposed in the intake duct 165, downstream of the compressor 180, to reduce the temperature of the air. Other engines may not include a turbocharger 175 and corresponding components for turbocharging.

The internal combustion engine 100 may also comprise one or more after-treatment devices 195, which may be disposed in the exhaust duct 170. In some systems with turbocharges, the after-treatment devices 195 may be positioned downstream of the turbine 185. The aftertreatment devices 195 may be or include any device configured to change the composition of the exhaust gasses, for example through retention and/or chemical transformation of some of their constituents. Some examples of aftertreatment devices 195 include, but are not limited to, catalytic converters (two and three way), oxidation catalysts, lean $NO_x$ traps, hydrocarbon adsorbers, selective catalytic reduction (SCR) systems, diesel oxidation catalysts (DOC), and particulate filters (e.g. Diesel particulate filters).

The internal combustion engine 100 may further include an electronic control unit (ECU) 200 configured to manage and control its operation. The ECU 200 may be in communication with one or more sensors configured to generate signals in proportion to various physical parameters associated with the internal combustion engine 100. These sensors may include, but are not limited to, a mass airflow and temperature sensor of the air flowing in the intake duct 165, a fuel rail pressure sensor, a crankshaft position sensor and exhaust pressure and temperature sensors. In addition, the sensors may include a temperature sensor 205 that is able to measure a temperature of the aftertreatment devices 195.

The methods, devices, and logic described above may be implemented in many different ways in many different combinations of hardware, software or both hardware and software. Based on the signal received from the sensors, the ECU 200 may be configured to generate output signals to various control devices that are arranged to control the operation of the internal combustion engine 100, including the fuel injectors 135. The ECU 200 may include a digital central processing unit (CPU) in communication with a memory system 210 and an interface bus. All or parts of the ECU 200 may additionally or alternatively include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. The internal combustion engine 100 may additionally or alternatively be equipped with a different type of processor to provide the electronic logic, e.g. an embedded controller, an onboard computer, or any processing module that might be deployed in the vehicle.

All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk.

For example, the CPU may be configured to execute instructions stored as a program in the memory system 210, and send and receive signals to/from the interface bus. The memory system 210 may include various storage types including optical storage, magnetic storage, solid state storage, and other non-volatile memory. The interface bus may be configured to send, receive, and modulate analog and/or digital signals to/from the various sensors and control devices. The program may embody the methods disclosed in the present disclosure, allowing the CPU to carryout out the steps of such methods and control the internal combustion engine 100.

The programs stored in the memory system 210 may be transmitted from outside via a cable or in a wireless fashion. Outside the memory system 210, the programs may be visible as a computer program products, which may also be called computer readable media or machine readable media in the art, and which should be understood to be computer program codes residing on carriers, said carriers being transitory or non-transitory in nature with the consequence that the computer program products can be regarded to be transitory or non-transitory in nature. An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a wireless connection to a laptop. In case of a non-transitory computer program product the computer program code may be embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an ASIC, a CD or the like.

The processing capability of these systems may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

One of the main tasks of the ECU 200 may be that of operating each fuel injector 135 to supply fuel into the corresponding cylinder 110. For example, the ECU 200 may send control signals or otherwise operate each fuel injector 130 to supply fuel when the corresponding piston 115 is in proximity of the TDC position between the compression stroke and the power stroke. In some embodiments, the fuel may be supplied by actuating the fuel injector 135 to perform a plurality of fuel injections according a multi-injection pattern.

An example multi-injection pattern may include one or more main injections, which may provide the majority of the fuel that is ignited or burnt inside the combustion chamber 120 and that effectively produce torque at the crankshaft 125. Some example multi-injection patterns may additionally or alternatively include one or more pilot injections, which may be performed before the main injection, usually in order to create better conditions for the combustion of the main injection. Some example multi-injection patterns may additionally or alternatively include one or more post-injections, which may be performed after the main injection. Some multi-injection patterns may include a main injection with both pilot injections and one or more post-injections. In any of these examples, the ECU 200 may send command signals to the fuel injectors 135, or otherwise control operation of the fuel injectors 135, to perform the injections.

The post-injection(s) may be performed after the ignition of the main injection, for example after the power stroke. By way of example, the post-injection(s) may be performed during the exhaust stroke. The post-injection(s) may take place immediately before or during (or in some cases both before and during) the opening of the exhaust vale 160, so that the fuel quantity injected by means of the post-injection(s) may exit the combustion chamber 120 unburnt.

One purpose of the post-injection may be for providing fuel to facilitate regenerating one or more of the after-treatment devices 195 (e.g. DPF) that are coupled to the exhaust system of the internal combustion engine to reduce polluting emissions.

In particular, post-injections can be used for raising the temperature of the after-treatment device(s) 195. Fuel injected via post-injections may enter the cylinder 110 (the combustion chamber 120) after the burn of the fuel injected via the main injection, and may exit unburnt from the cylinder 110 via the open exhaust valve into the exhaust system and toward the after-treatment device(s) 195.

The unburnt fuel may flow through the exhaust duct 170 toward the after-treatment devices 195. The fuel injected via the post-injections may then be ignited directly within the exhaust system, thereby raising the temperature of the exhaust gasses flowing therein. In this way, these high-temperature exhaust gasses may flow through one or more of the after-treatment devices 195 (such as the DPF), thereby further heating the after-treatment device 195. The ignition within the exhaust system may be caused, in some instances, due to catalytic reactions (such as ignition within the DOC), or in other ways. In still other systems, the fuel may be ignited within the exhaust system in proximity of the aftertreatment device.

For this reason, the post-injections may be beneficially used for regenerating some of these aftertreatment devices 195 when clogged. In fact, these aftertreatment devices 195 (e.g. DPFs) may be designed to retain some of the pollutants (e.g. particulate matter) contained into the exhaust gasses and become progressively clogged as the amount of accumulated pollutants increases. When this amount of pollutants exceeds a predetermined threshold, these aftertreatment devices 195 must be regenerated to restore the original efficiency and the regeneration may be achieved by increasing their temperature up to values (e.g. higher than 500° C.) that promote the oxidation of the accumulated pollutants, for example using the above-mentioned post-injections.

In view of the foregoing, e.g. during the regeneration of an aftertreatment device 195, the ECU 200 may be configured to control each fuel injector 135 by repeating a procedure that includes the steps of determining a requested value of a fuel quantity to be injected by means of one post-injection and then actuating the fuel injector 135 to actually perform one post-injection of a fuel quantity corresponding to the requested value. This method may be performed once per engine cycle of a corresponding piston 115, or at other intervals.

The requested value of the fuel quantity may be determined by the ECU 200 in various ways. In some examples, the ECU 200 may calculate, measure, or otherwise determine the fuel quantity with a feedback control logic using the requested value as controlled variable and the temperature of the aftertreatment device 195 as controlling variable.

In other words, the ECU 200 may measure the temperature of the aftertreatment device 195, for example by means of the temperature sensor 205, calculate a difference between the measured value of the temperature and a target value thereof, and then calculate the requested value of a fuel quantity on the basis of that difference, for example as the output of a controller (e.g. a proportional-derivative (PD) or proportional-integral-derivative (PID) controller) receiving as input the difference between the measured value and the target value of the aftertreatment device temperature.

This process may be difficult in some systems, based on physical limitations of the fuel injectors. For example, in some instances, fuel injectors may be rated or approved for injecting at least a minimum amount of fuel every time they are commanded to perform one fuel injection. In some instances, the fuel injector may physically incapable of metering or providing less than a minimum amount of fuel when activated.

In other words, a fuel injector may be generally unable to inject less than the minimum amount of fuel every single fuel injection.

Accordingly, the requested value of the fuel quantity may be so small that the fuel injector 135 may be unable to perform the post-injection without introducing a relevant error between the requested value and the value of the fuel quantity that is actually injected, thus increasing the fuel consumption and causing the risk of overheating the after-treatment device 195. The system may additionally or alternatively experience control instability when processing the fuel requests and analyzing the prior and resulting data.

To overcome these issues, the ECU 200 may be configured to set a minimum value QMIN of the fuel quantity that can be injected by the injection apparatus 130 (i.e. by a single fuel injector 135) into the internal combustion engine 100 with one single injection. The ECU 200 may prevent the injection apparatus 130 from performing small post-injections corresponding to fuel quantities having a smaller value than the minimum value QMIN.

In some embodiments, the minimum value QMIN may be a calibration parameter determined by means of an experimental activity and then stored into the memory system 210, where it can be simply read or retrieved by the ECU 200. In these systems, the minimum value of the fuel quantity can be selected case-by-case on the basis of the performances of the injection apparatus. In other embodiments, the minimum value of the fuel quantity may be a value set according to fuel injector specifications or based on manufacturer recommendations. In still other embodiments, the minimum value of the fuel quantity may be modified or "tuned" by the user of the engine. Other variations are possible.

To improve the effectiveness of the post-injections by the injection apparatus 130, the ECU 200 may be configured to operate in various different ways.

Figure 2:
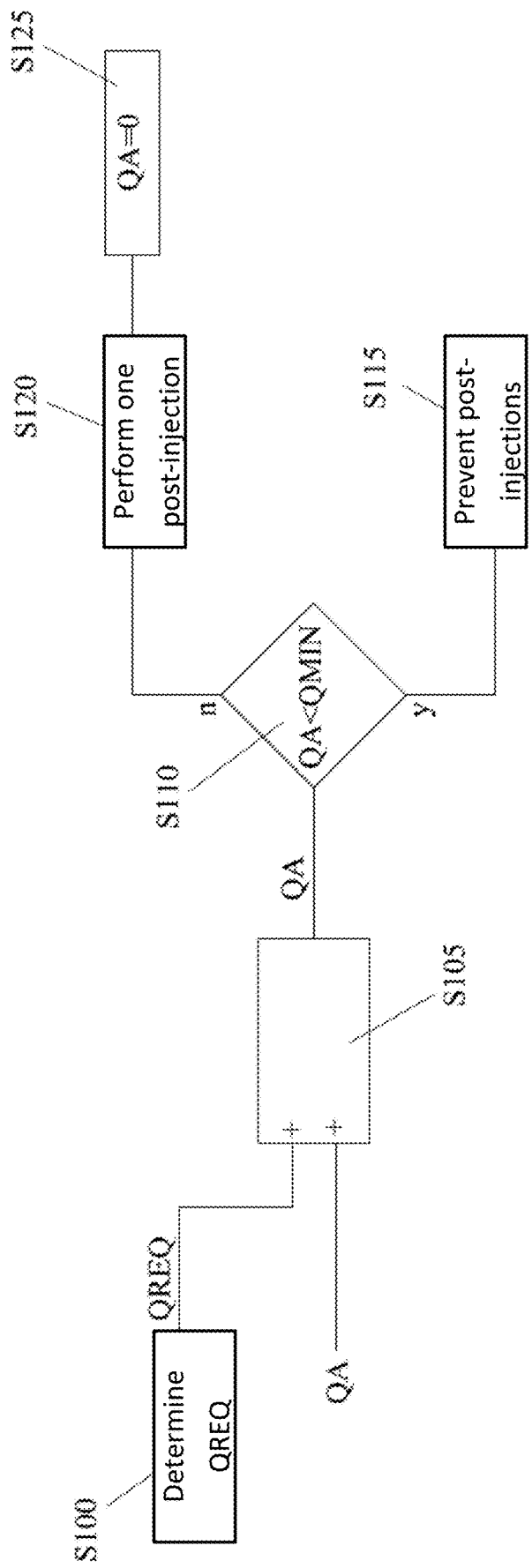
FIG. 2 is a flowchart illustrating a control cycle according to an embodiment of the disclosure.

For example, according to the embodiment of FIG. 2, the ECU 200 may be configured to periodically repeat (e.g. once per engine cycle), a control cycle that includes several steps.

As a first step, the control cycle may provide for the ECU 200 to determine the requested value QREQ of the fuel quantity to be injected by means of one post-injection (block S100).

The requested value QREQ may be determined with the feedback control logic that has been explained above, or in various other ways, such as based on look-up tables, constants, or other variations.

The ECU 200 may add the requested value QREQ of the fuel quantity to a value QA of an aggregate fuel quantity that has been obtained in a latest preceding execution of the control cycle (adder at block S105).

The requested value QREQ may be added to an old value QA of the aggregate fuel quantity that has been yielded by the latest preceding control cycle, in order to obtaining an updated value QA. The updated QA value may replace the old QA value in subsequent cycles (specifically if ECU 200 finds QA<QMIN in block S110).

In this way, the aggregate fuel quantity represents the sum (or the integral over time) of the requested values of the fuel quantity determined in a number of consecutive control cycles.

Though not shown, in some systems, QA may be further processed to be an integer value, by way of a floor(QA) calculation. Other systems may not include this floor calculation, and may add, store, and process the QA value without any floor or ceiling calculation.

The control cycle then provides for the ECU 200 to compare (block S110) the updated value QA of the aggregate fuel quantity with the minimum value QMIN.

If the updated value QA is smaller than the minimum value QMIN, the ECU 200 is configured to prevent the injection apparatus 130 from performing any post-injections for the current control cycle (block S115).

On the contrary, if the updated value QA is equal to or larger than the minimum value QMIN, the ECU 200 may be configured to command the injection apparatus 130 (i.e. one fuel injector 135) to actually perform one post-injections of a fuel quantity having a value which is equal to the current value QA of the aggregate fuel quantity (block S120).

After commanding the post-injection at block S120, the control cycle further provides for the ECU 200 to reset the aggregate fuel quantity value QA to zero before the next control cycle is performed (block S125).

In this way, the ECU 220 may control the injection apparatus 130 to wait and to efficiently perform post-injections only when the total amount of the post-injection requested fuel quantity, represented by the aggregate fuel quantity value, is actually above the preset minimum value QMIN. This results in fuel consumption savings and efficient after-treatment regeneration without over-heating the after-treatment devices 195 (or alternatively allowing the after-treatment devices 195 to clog if no post-injections were provided).

The control strategy in FIG. 2 may be applied to each fuel injector 135 of the injection apparatus 130 individually or to all the fuel injectors 135 of the injection apparatus 130 as a whole.

In the first case, each fuel injector 135 may be associated to a correspondent aggregate fuel quantity representing the sum (or the integral over time) of the post-injected fuel quantities requested only from that fuel injector 135, so that each fuel injector 135 will be individually actuated to perform one post-injection of the correspondent total amount of fuel only when the value of the correspondent aggregate fuel quantity is equal to or exceeds the minimum value QMIN.

In the second case, there may be a single aggregate fuel quantity representing the sum (or the integral over time) of the post-injected fuel quantities requested from all the fuel injectors 135 of the injection apparatus 130, and the post-injection of the total amount of fuel may be performed by fuel injector 135 for which the latest requested value QREQ has been determined that causes the aggregate fuel quantity value to reach the minimum value QMIN.

As an alternative, the post-injection of the total amount of fuel may be performed by the fuel injector 135 associated to the piston 115 that is in the best position over its engine cycle, e.g. at BDC position when the aggregate fuel quantity value reaches or exceeds the minimum value QMIN.

Figures 4, 5:
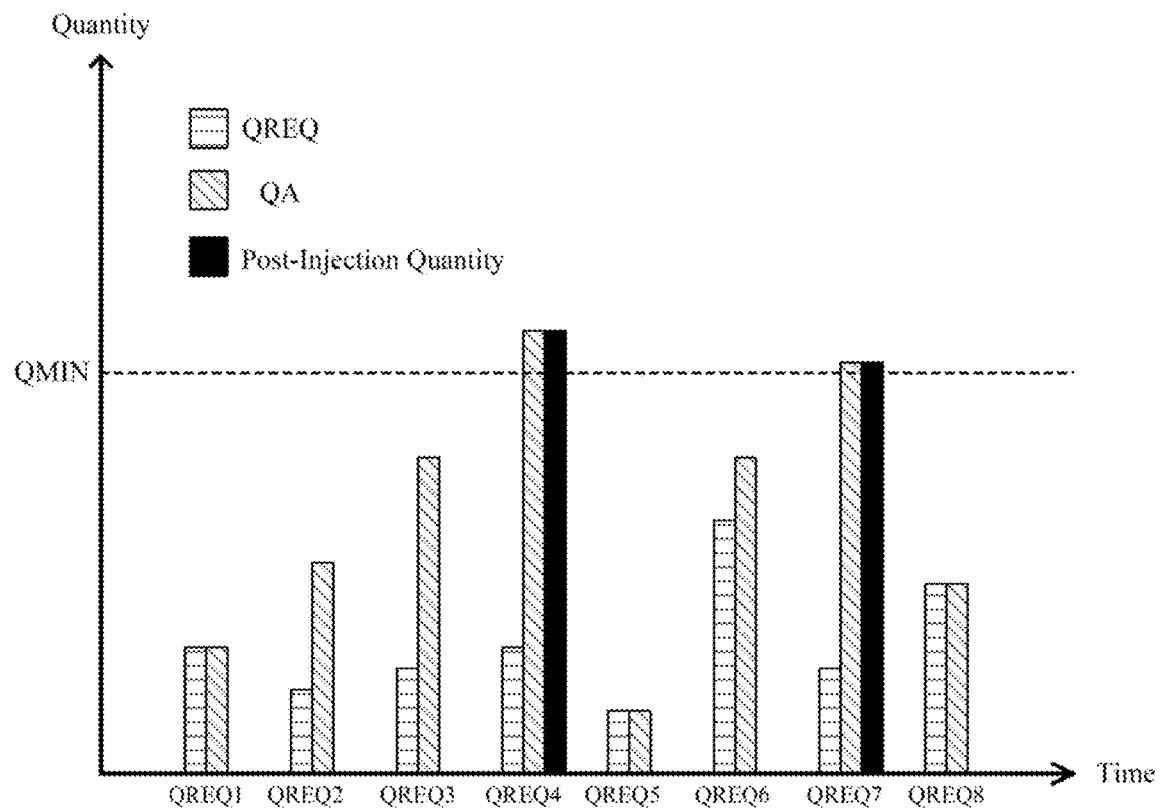
FIG. 4 is a graph illustrating the potential application of the control cycle according to an embodiment of the disclosure.
FIG. 5 is an example of a calibration vector that may be used in one of the embodiments of the disclosure.

FIG. 4 shows an example of an application of the control cycle shown in FIG. 2 over eight iterations. At a first time, QREQ1 is received, and aggregated into QA, whose previous quantity was 0. Accordingly after QREQ1, QA=QREQ1, and both are below the QMIN value.

At a second time, QREQ2 is received, and aggregated with the previous QA to identify a resulting QA=QREQ1+QREQ2. QA is still less than QMIN. At a third time, QREQ3 is received, and again aggregated with the previous QA, such that QA now equals QREQ1+QREQ2+QREQ3, the aggregation of which is still less than QMIN. To this point, the ECU 200 has been preventing or ensuring that the fuel injector(s) have not provided any post-injections.

At a fourth time, QREQ4 is received and aggregated with QA. The resulting QA equals the sum of QREQ1 through QREQ4. This aggregated QA finally exceeds the QMIN, and the ECU 200 commands the fuel injector to inject QA (which is the sum of QREQ1 through QREQ4) of fuel via a post-injection. QA is thereafter reset to zero.

At a fifth time, QREQ5 is received and aggregated with QA (which was reset to zero), and the process continues accordingly. By the seventh time, the aggregation of QA (which equals QREQ5+QREQ6+QREQ7) exceeds QMIN, and again, the ECU commands the fuel injector to inject QA of fuel via post-injection, and QA is again reset.

As noted, this control system and method may be performed on a cylinder-by-cylinder basis (such that each QREQ is received and aggregated only for the specific cylinder 110), or may be aggregated over all cylinders (such that, for example in a 4-cylinder engine, QREQ1 and QREQ5 may be received for a first cylinder, QREQ2 and QREQ6 may be received for a second cylinder, etc.). Other variations are possible.

Figure 3:
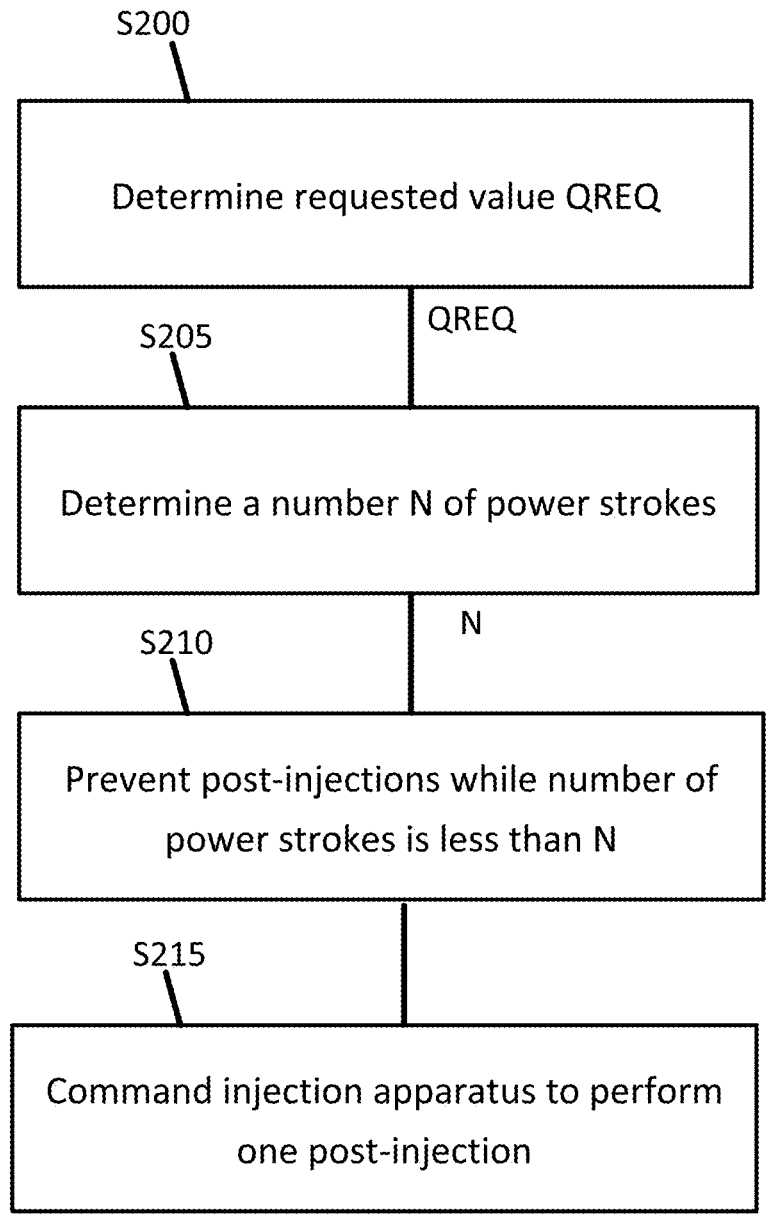
FIG. 3 is a flowchart illustrating a control cycle according to another embodiment of the disclosure.

FIG. 3 provides another example of a control cycle that the ECU 200 may be configured to repeat to control post-injections.

This control cycle includes a first block (S200) where the ECU 200 determines the requested value QREQ of the fuel quantity to be injected by means of one post-injection. This may be performed in any of the ways previously discussed, including, for example using a feedback control logic.

In block S205, the ECU 200 determines, on the basis of the requested value QREQ, a number N of power strokes the injection apparatus 130 should wait prior to performing post-injections until the internal combustion engine 100 has performed that number of power strokes. In block S210, the ECU 200 prevents the injection apparatus 130 from performing any post-injections while the number of power strokes experienced is less than N.

In block S215, once the prescribed number N of power strokes has been done, the control strategy finally provides for the ECU 200 to command the injection apparatus 130 (i.e. one fuel injector 135) to perform one post-injection of a fuel quantity having a value which is equal to or greater than the minimum value QMIN (block S215).

As with the control strategy in FIG. 2, the control strategy in FIG. 3 may be applied to each fuel injector 135 of the injection apparatus 130 individually or to all the fuel injectors 135 of the injection apparatus 130 as a whole.

In the first case, the one post-injection of the minimum fuel quantity QMIN will be performed by the same fuel injector 135 for which the requested value QREQ of the fuel quantity has been determined, only when the corresponding piston 115 has performed the prescribed number N of power stroke.

In the second case, the one post-injection of the minimum fuel quantity QMIN will be performed by the first fuel injector 135 that has to be actuated after the internal combustion engine 100 as a whole (i.e. considering all the pistons 115) has performed the prescribed number N of power strokes.

Regardless from this considerations, an aspect of this embodiment provides that the number N of power strokes to wait before performing the one post-injection (calculated in block S205) may be determined from a calibration vector.

The calibration vector, which may be determined by means of an experimental activity and then stored in the memory system 210, may be configured to receive as input the requested value QREQ of the fuel quantity and to yield as output a corresponding number N of power strokes.

In particular, the calibration vector may be designed so that higher numbers of power strokes correspond to lower requested values QREQ of the fuel quantity and vice versa. One example of such a calibration vector is shown in FIG. 5. Here, QREQ may refer to the first request received after the last post-injection was delivered. In some instances, QREQ may represent Floor (QREQ), or alternatively Ceiling (QREQ). In other instances, QREQ may comprise a range of values. The number of strokes that the ECU 200 should wait before handling a post-injection may be determined by looking up the received QREQ in the calibration vector or lookup table. The number of strokes may be measured in various ways. In some systems, the number of strokes is measured as the number of times the piston is in a top-dead-center (TDC) or bottom-dead-center (BDC) position within the cylinder 110. Other methods of determining the number of strokes are possible.

After identifying N, the ECU 200 may then wait that number of strokes, after which a volume of fuel may be injected via post-injection. In some systems, the volume may be QREQ. In other systems, the volume may be QMIN. In a hybrid system, the volume may be QMIN whenever N>1, and may be QREQ whenever N is equal to or less than 1. Other variations are possible.

As an alternative, the number N of power strokes to wait before performing the one post-injection may be determined as a function of both the requested value QREQ of the fuel quantity and the minimum value QMIN.

In particular, the number of power strokes may be determined with the following equation:

$$\text{Floor}\left(\frac{QMIN}{QREQ} + K\right) = N$$

wherein the floor function is the function that takes as input a real number and gives as output the greatest integer less than or equal to said real number, N is the number of power strokes, QMIN is the minimum value of the fuel quantity, QREQ is the requested value of the fuel quantity and K is a constant comprised between 0 and 1, for example equal to 0.5.

By way of example, assuming that the minimum value QMIN of the injection quantity (generally based on the specifications of the fuel injector) is equal to 3 mg and that a requested value QREQ of 0.82 mg is determined for one fuel injector 135, the ECU 200 may calculate the number N of power strokes to wait as:

$$N = \text{Floor}\left(\frac{3}{0.82} + 0.5\right) = \text{Floor}(3.65 + 05) = \text{Floor}(4.15) = 4$$

so that then the ECU 200 will actuate the post-injection of the minimum fuel quantity QMIN after four consecutive power strokes.

The following systems and methods may be used regardless of units, values, or restrictions on injection systems. In some systems, the values of QMIN, QREQ, etc. may be measured in mg/stroke, but other variations (such as variations in scale or size) are possible.

Any and all methods described herein may include determinations in relation to one or more thresholds. While these methods may refer to a determination about whether a parameter exceeds a threshold, the determination may in other variations be whether the parameter is greater than or equal to the threshold (and vice versa). Similarly, where the methods may refer to a determination about whether a parameter is less than a threshold, the determination may in other variations be whether the parameter is less than or equal to the threshold (and vice versa). Other variations are possible.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A method of controlling an injection apparatus of an internal combustion engine, the method comprising:
   setting a minimum value (QMIN) of a fuel quantity that can be injected into the internal combustion engine by the injection apparatus with one injection;
   preventing the injection apparatus from performing post-injections of fuel quantities having a smaller value than the minimum value (QMIN),
   determining a requested value (QREQ) of a fuel quantity to be injected into the internal combustion engine by one post-injection;
   determining or calculating a number of power strokes (N) on a basis of the requested value (QREQ) of the fuel quantity;
   preventing the injection apparatus from performing post-injections until that number (N) of power strokes have been done; and
   commanding the injection apparatus to perform a post-injection of a fuel quantity having a value which is equal to or greater than the minimum value (QMIN).

2. The method according to claim 1, wherein the number (N) of power strokes is determined as output of a calibration vector receiving the requested value (QREQ) of the fuel quantity as input.

3. The method according to claim 1, wherein the number (N) of power strokes is determined as a function of both the requested value (QMIN) of the fuel quantity and the minimum value (QMIN) thereof.

4. The method according to claim 3, wherein the number (N) of power strokes is determined with the following equation:

$$\text{Floor}\left(\frac{QMIN}{QREQ} + K\right) = N$$

wherein N is the number of power strokes, QMIN is the minimum value of the fuel quantity, QREQ is the requested value of the fuel quantity and K is a constant.

5. The method according to claim 1, wherein determining the requested value (QREQ) of the fuel quantity comprises:
   measuring a temperature of an engine aftertreatment system;
   calculating a difference between the measured temperature and a target value thereof; and
   calculating the requested value (QREQ) of the fuel quantity as a function of the difference.

6. The method of claim 1, wherein the minimum value (QMIN) of the fuel quantity is a calibration parameter determined by an experimental activity.

7. The method of claim 1, wherein the injection apparatus is prevented from performing post-injections of fuel quantities having a smaller value than the minimum value by repeating a control cycle.

8. The method of claim 7, further comprising:
   determining a requested value (QREQ) of a fuel quantity to be injected into the internal combustion engine by one post-injection;
   adding the requested value (QREQ) to an aggregate fuel quantity value (QA) obtained in a latest preceding execution of the control cycle;
   preventing the injection apparatus from performing post-injections, if the aggregate fuel quantity value (QA) is smaller than the minimum value (QMIN);
   commanding the injection apparatus to perform one post-injection of a fuel quantity having a value equal to the aggregate fuel quantity value (QA), when the aggregate fuel quantity value (QA) is equal to or larger than the minimum value (QMIN); and
   resetting the aggregate fuel quantity value (QA) to zero, when the one post-injection is performed.

9. The method of claim 1, wherein the post-injections are injections performed after a main injection or after a power stroke.

10. The method of claim 1, wherein the post-injections are injections performed during an exhaust stroke.

11. An internal combustion engine comprising:
    an injection apparatus; and
    an electronic control unit configured to set a minimum value (QMIN) of a fuel quantity that can be injected into the internal combustion engine by the injection apparatus with one injection and prevent the injection apparatus from performing post-injections of fuel quantities having a smaller value than the minimum value (QMIN),
    wherein the electronic control unit is configured to determine a requested value (QREQ) of a fuel quantity to be injected into the internal combustion engine by one post-injection, determine a number of power strokes (N) on a basis of the requested value (QREQ) of the fuel quantity,
    wherein the electronic control unit is configured to prevent the injection apparatus from performing post-injections until the number (N) of power strokes have been performed and command the injection apparatus to perform a post-injection of a fuel quantity having a value which is equal to or greater than the minimum value (QMIN).

12. The internal combustion engine according to claim 11, wherein the number (N) of power strokes is determined as output of a calibration vector receiving the requested value (QREQ) of the fuel quantity as input.

13. The internal combustion engine according to claim 11, wherein the number (N) of power strokes is determined as a function of both the requested value (QMIN) of the fuel quantity and the minimum value (QMIN) thereof.

14. The internal combustion engine according to claim 11, wherein the minimum value (QMIN) of the fuel quantity is a calibration parameter determined by an experimental activity.

15. A non-transitory computer readable medium including instructions that when executed by processor are configured to perform:
- setting a minimum value (QMIN) of a fuel quantity that can be injected into an internal combustion engine by an injection apparatus with one injection;
- preventing the injection apparatus from performing post-injections of fuel quantities having a smaller value than the minimum value (QMIN);
- determining a requested value (QREQ) of a fuel quantity to be injected into the internal combustion engine by one post-injection;
- determining or calculating a number of power strokes (N) on a basis of the requested value (QREQ) of the fuel quantity;
- preventing the injection apparatus from performing post-injections until that number (N) of power strokes have been done; and
- commanding the injection apparatus to perform a post-injection of a fuel quantity having a value which is equal to or greater than the minimum value (QMIN).

* * * * *